(12) United States Patent
Kong et al.

(10) Patent No.: US 8,645,353 B2
(45) Date of Patent: Feb. 4, 2014

(54) ANCHOR IMAGE IDENTIFICATION FOR VERTICAL VIDEO SEARCH

(75) Inventors: Xiao Kong, Issaquah, WA (US); Wei Wang, Beijing (CN); Rui Cai, Beijing (CN); Haifeng Li, Beijing (CN); Yanfeng Sun, Redmond, WA (US)

(73) Assignee: Microsoft Corporation, Redmond, WA (US)

( * ) Notice: Subject to any disclaimer, the term of this patent is extended or adjusted under 35 U.S.C. 154(b) by 0 days.

(21) Appl. No.: 13/166,810

(22) Filed: Jun. 23, 2011

(65) Prior Publication Data

US 2012/0330922 A1    Dec. 27, 2012

(51) Int. Cl.
*G06F 17/30* (2006.01)

(52) U.S. Cl.
USPC .............. 707/709; 707/E17.108; 715/234; 715/760; 725/41; 725/43; 725/44

(58) Field of Classification Search
USPC .......... 707/673, 759, 769, 709, 748, E17.014, 707/E17.108; 709/217, 218, 219; 715/760, 715/771, 786, 206, 236, 237, 825, 810, 817, 715/826, 234; 725/41, 43, 44, 115, 135, 725/143; 348/563, 564, 565
See application file for complete search history.

(56) References Cited

U.S. PATENT DOCUMENTS

| | | | |
|---|---|---|---|
| 6,115,072 A * | 9/2000 | Vuong et al. .................. 348/445 |
| 6,311,194 B1 | 10/2001 | Sheth et al. |
| 6,336,117 B1 * | 1/2002 | Massarani ...................... 707/711 |
| 6,463,444 B1 | 10/2002 | Jain et al. |
| 6,643,641 B1 | 11/2003 | Snyder |
| 6,658,402 B1 * | 12/2003 | Dutta ............................. 709/217 |
| 6,665,443 B1 | 12/2003 | Carrig |
| 6,665,836 B1 | 12/2003 | Wynblatt et al. |
| 6,829,780 B2 | 12/2004 | Kraft et al. |
| 7,421,455 B2 | 9/2008 | Hua et al. |
| 7,822,760 B2 | 10/2010 | Yuen |
| 8,126,868 B1 * | 2/2012 | Vincent ......................... 707/708 |
| 8,364,671 B1 * | 1/2013 | Sinton et al. .................. 707/728 |
| 2001/0018693 A1 | 8/2001 | Jain et al. |
| 2002/0038299 A1 | 3/2002 | Zernik et al. |
| 2002/0103920 A1 | 8/2002 | Berkun et al. |
| 2002/0169801 A1 * | 11/2002 | Barnes et al. ................. 707/513 |
| 2004/0059586 A1 * | 3/2004 | Brimberry et al. ............... 705/1 |
| 2004/0230558 A1 * | 11/2004 | Tokunaka ......................... 707/1 |
| 2005/0177568 A1 | 8/2005 | Diamond et al. |
| 2005/0193014 A1 | 9/2005 | Prince |
| 2006/0215984 A1 * | 9/2006 | Nesvadba et al. ............... 386/46 |
| 2007/0067304 A1 * | 3/2007 | Ives ................................ 707/10 |
| 2007/0067333 A1 | 3/2007 | Cho et al. |

(Continued)

OTHER PUBLICATIONS

Zihou Zhou—"Evaluating websites using a practical quality model"—http://hdl.handle.net/2086/3422, 2009, De Montfort University, Software Technoloy Research Laboratory, (pp. 1-113).*

(Continued)

*Primary Examiner* — Jean B Fleurantin
*Assistant Examiner* — Anh Ly
(74) *Attorney, Agent, or Firm* — Hope Baldauff, LLC

(57) ABSTRACT

Anchor images and information associated therewith are accumulated during a Web crawling operation. One or more rules are applied to the accumulated candidate anchor images to filter out candidate anchor images that are not appropriate for use as the anchor image for a particular target video. The remaining candidate anchor image is then selected as the anchor image for the particular video.

18 Claims, 12 Drawing Sheets

(56) References Cited

U.S. PATENT DOCUMENTS

| | | | |
|---|---|---|---|
| 2007/0106750 A1* | 5/2007 | Moore | 709/217 |
| 2007/0116036 A1* | 5/2007 | Moore | 370/462 |
| 2007/0255702 A1* | 11/2007 | Orme | 707/5 |
| 2007/0282819 A1 | 12/2007 | Lynn et al. | |
| 2008/0097970 A1 | 4/2008 | Olstad et al. | |
| 2008/0140577 A1* | 6/2008 | Rahman et al. | 705/71 |
| 2008/0147608 A1 | 6/2008 | Sarukkai | |
| 2008/0154889 A1* | 6/2008 | Pfeiffer | 707/5 |
| 2008/0201118 A1 | 8/2008 | Luo | |
| 2008/0275901 A1 | 11/2008 | Chakrabarti et al. | |
| 2009/0024700 A1* | 1/2009 | Garg et al. | 709/203 |
| 2009/0037967 A1 | 2/2009 | Barkan et al. | |
| 2009/0077158 A1* | 3/2009 | Riley et al. | 709/202 |
| 2009/0144392 A1 | 6/2009 | Wang et al. | |
| 2009/0248707 A1 | 10/2009 | Mehta et al. | |
| 2009/0271283 A1* | 10/2009 | Fosnacht et al. | 707/E17.014 |
| 2009/0324120 A1 | 12/2009 | Farouki et al. | |
| 2010/0083144 A1 | 4/2010 | Baxley et al. | |
| 2010/0131870 A1 | 5/2010 | Park | |
| 2010/0145924 A1 | 6/2010 | Zabramski et al. | |
| 2010/0169362 A1 | 7/2010 | Bulfani et al. | |
| 2010/0192055 A1 | 7/2010 | Shaked et al. | |
| 2010/0235765 A1* | 9/2010 | Worthington | 715/760 |
| 2011/0035345 A1 | 2/2011 | Duan et al. | |
| 2011/0167360 A1 | 7/2011 | Aitken et al. | |
| 2011/0191328 A1* | 8/2011 | Vernon et al. | 707/723 |
| 2011/0209046 A1 | 8/2011 | Huang et al. | |
| 2011/0270843 A1 | 11/2011 | Albin | |
| 2011/0289108 A1* | 11/2011 | Bhandari et al. | 707/769 |
| 2011/0289182 A1 | 11/2011 | Kong et al. | |
| 2011/0302510 A1 | 12/2011 | Harrison et al. | |
| 2012/0010995 A1 | 1/2012 | Skirpa et al. | |
| 2012/0023126 A1* | 1/2012 | Jin et al. | 707/769 |
| 2012/0089589 A1 | 4/2012 | Tsao | |
| 2012/0203734 A1 | 8/2012 | Spivack et al. | |
| 2012/0330952 A1 | 12/2012 | Kong et al. | |

OTHER PUBLICATIONS

Bill N. Schilit, Jonathan Trevor, David M. Hilbert, and Tzu Khiau Koh—"m-links: An infrastructure for very small internet devices"—Proceeding MobiCom '01 Proceedings of the 7th annual international conference on Mobile computing and networking pp. 122-131.*

Zachary, et al., "Content Based Image Retrieval Systems", Retrieved at <<http://ieeexplore.ieee.org/stamp/stamp.jsp?tp=&arnumber=756762>>, Application-Specific Systems and Software Engineering and Technology, 1999, pp. 8

Ng, et al., "Collages as Dynamic Summaries of Mined Video Content for Intelligent Multimedia Knowledge Management", Retrieved at <<http://www.aaai.org/Papers/Symposia/Spring/2003/SS-03-08/SS03-08-006.pdf>>, 2003, pp. 10.

Han, et al., "Automatic Document Metadata Extraction using Support Vector Machines", Retrieved at <<http://ieeexplore.ieee.org/stamp/jsp?tp=&arnumber=1204842>>, Joint Conference on Digital Libraries (JCDL), May 27-31, 2003, pp. 12.

Mason, Jane E., "An N-Gram Based Approach to the Automatic", Retrieved at <<http://dalspace.library.dal.ca:8080/bitstream/handle/10222/12351/thesis_16_12_09.pdf?sequence=2>>, Dec. 2009, pp. 172.

Barclay, et al., "The Microsoft TerraServer", Retrieved at <<http://arxiv.org/abs/cs/9809011>>, Technical Report, MSR-TR-98-17, Jun. 1998, pp. 33.

U.S. Official Action dated Apr. 17, 2013 in U.S. Appl. No. 13/166,813.

U.S. Official Action dated Sep. 18, 2012 in U.S. Appl. No. 13/166,813.

Smith et al., 37 Learning and Classification of Semantic Concepts in Broadcast Video38, Retrieved at https://analysis.mitre.org//proceedings/Final_Papers_Files/362_Camera_ReadI.Paper. pdf , In 1st International Conference on Intelligence Analysis. Assistant Director of Central Intelligence for Analysis and Production, Apr. 2005, pp. 6.

Smith, et al., "Visually Searching the Web for Content", Retrieved at http://ieeexplore.ieee.org/stamp/stamp.jsp?tp=&arnumber=621578, IEEE Multimedia, vol. 04, No. 3, Jul.-Sep. 1997, pp. 12-20.

"Extracting and Preparing Metadata to Make Video Files Searchable", Retrieved at http://www.telestream.net/pdfs/whitepapers/wp-preparing-video-metadata.pdf, Retrieved Date: Jan. 18, 2011, pp. 6.

U.S. Notice of Allowance dated Sep. 30, 2013 in U.S. Appl. No. 13/166,813.

Schchekotykhin et al.—"Clustering Web Documents with tables for Information Extraction," Oct. 28-31, 2007, K-CAP'07, Whistler, British Columbia, Canada, ACM-2007, (pp. 169-170).

IBM, "Architecture for discovery and analysis of web page designs," Dec. 10, 2007, An IP.com prior art database technology disclosure, (pp. 1-3).

* cited by examiner

ANCHOR IMAGE IDENTIFICATION FOR VERTICAL VIDEO SEARCH

BACKGROUND

Search engines are some of the most frequently utilized sites on the World Wide Web (the "Web"). Search engines typically receive input as one or more search terms, perform a query of a database for Web pages matching the search terms, and return search results as a list of hyperlinks to Web pages from which a user can select one of the hyperlinks to visit a corresponding Web page.

Users looking for specific content types can choose to search for only a desired content type directly through a content-specific search engine called a vertical search engine. Vertical search engines provide many benefits over traditional, general-purpose search engines, the most fundamental benefit being the extremely focused results that vertical search engines are able to provide for users. For example, a video search engine may provide functionality for searching video content.

Video content often has metadata associated therewith that can be useful to a user in determining which search result to select. This metadata may include, for example, title, description, publication/upload date, and/or length for a particular video. In addition to metadata, users often expect a representative image for each video in the search results. A representative image provides users with a visual indication of content contained within a particular video.

Gathering metadata and representative images is typically done manually. This can be time-consuming and costly for the search engine provider. Often times, search engine providers are tasked with finding a video, its metadata, and its representative image, and associating this information together in a database. Aside from the time and cost associated with this practice, extracting metadata and finding representative images in this manner can adversely affect the accuracy and precision of search results ultimately provided to users due, for example, to human error.

It is with respect to these and other considerations that the disclosure made herein is presented.

SUMMARY

Concepts and technologies are described herein for anchor image identification for vertical video search. An anchor image is a representative image that has been selected for display as the representative image for a video. Candidate anchor images are representative images for videos that can be selected for a video but may be considered inappropriate as determined, for example, by one or more filtering rules.

In accordance with the concepts and technologies disclosed herein, anchor images and information associated therewith are accumulated during a Web crawling operation. One or more rules are applied to the accumulated candidate anchor images to filter out candidate anchor images that are not appropriate for use as the anchor image for a particular target video. The remaining candidate anchor image is then selected as the anchor image for the particular video.

According to one aspect, a computer-implemented method for accumulating candidate anchor images includes performing computer-implemented operations for identifying an image link during a Web crawling operation performed by a Web crawler of a video search application and determining if the image link points to a Web page having a video page pattern. The method further includes disregarding the image link if it is determined that the image link does not point to the Web page and associating the image link with the Web page if it is determined that the image like does point to the Web page.

According to another aspect, a computer-implemented method for identifying candidate anchor images includes performing computer-implemented operations for identifying a target image for consideration as an anchor image for a target video page, applying one or more rules regarding anchor image selection to the target image, and based upon the rules, determining if the target image should be selected as the anchor image. If it is determined that the target image should not be selected as the anchor image, the method further includes disregarding the target image. If it is determined that the target image should be selected as the anchor image, the method further includes identifying the target image as the anchor image for the target video page.

According to yet another aspect, a computer storage medium has computer readable instructions stored thereupon that, when executed by a computer, cause the computer to identify an image link during a Web crawling operation performed by a Web crawler of a video search application, determine if the image link points to a Web page having a video page pattern, disregard the image link if it is determined that the image link does not point to the Web page, and associate the image link with the Web page if it is determined that the image link does point to the Web page. The instructions can further include instructions, the execution of which cause the computer to apply one or more rules regarding anchor image selection to a target image associated with the image link and, based upon application of the rules, determine if the target image should be selected as the anchor image. If it is determined that the target image should not be selected as the anchor image, the instructions cause the computer to disregard the target image. If it is determined that the target image should be selected as the anchor image, the instructions cause the computer to identify the target image as the anchor image for the target video page.

It should be appreciated that the above-described subject matter may be implemented as a computer-controlled apparatus, a computer process, a computing system, or as an article of manufacture such as a computer-readable storage medium. These and various other features will be apparent from a reading of the following Detailed Description and a review of the associated drawings.

This Summary is provided to introduce a selection of concepts in a simplified form that are further described below in the Detailed Description. This Summary is not intended to identify key features or essential features of the claimed subject matter, nor is it intended that this Summary be used to limit the scope of the claimed subject matter. Furthermore, the claimed subject matter is not limited to implementations that solve any or all disadvantages noted in any part of this disclosure.

DETAILED DESCRIPTION

Figure 1:
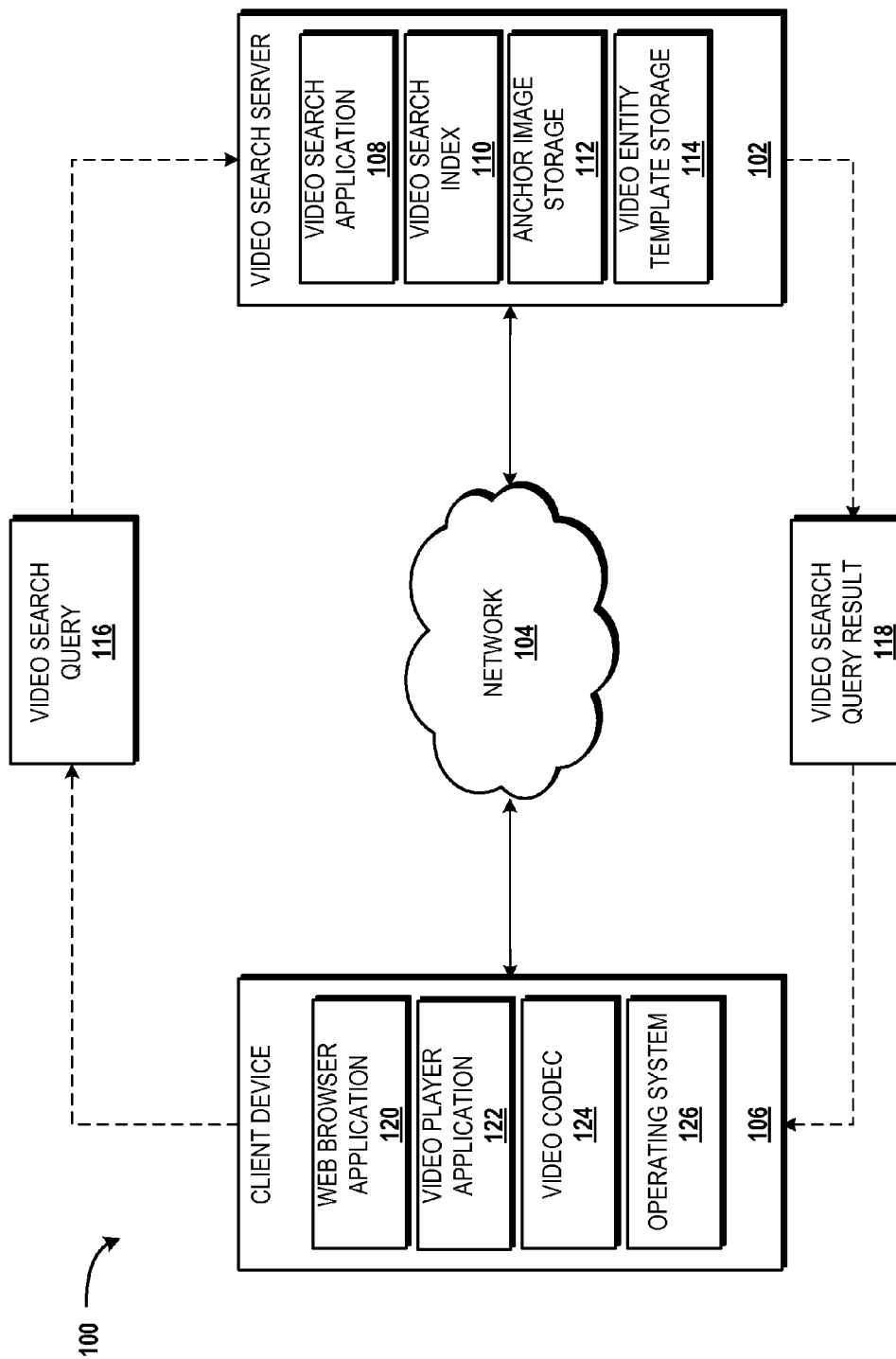
FIG. 1 is a system diagram illustrating an exemplary operating environment for the various embodiments disclosed herein.

The following detailed description is directed to concepts and technologies for anchor image identification for video search. In accordance with the concepts and technologies disclosed herein, anchor images and information associated therewith are accumulated during a Web crawling operation. One or more rules are applied to the accumulated candidate anchor images to filter out candidate anchor images that are not appropriate for use as the anchor image for a particular target video. The remaining candidate anchor image is then selected as the anchor image for the particular video.

While the subject matter described herein is presented in the general context of program modules that execute in conjunction with the execution of an operating system and application programs on a computer system, those skilled in the art will recognize that other implementations may be performed in combination with other types of program modules. Generally, program modules include routines, programs, components, data structures, and other types of structures that perform particular tasks or implement particular abstract data types. Moreover, those skilled in the art will appreciate that the subject matter described herein may be practiced with other computer system configurations, including hand-held devices, multiprocessor systems, microprocessor-based or programmable consumer electronics, minicomputers, mainframe computers, and the like.

In the following detailed description, references are made to the accompanying drawings that form a part hereof, and in which are shown by way of illustration specific embodiments or examples. Referring now to the drawings, in which like numerals represent like elements throughout the several figures, aspects of a computing system, computer-readable storage medium, and computer-implemented methodology for anchor image identification for video search will be presented.

Referring now to FIG. 1, aspects of one operating environment 100 for the various embodiments presented herein will be described. The operating environment 100 shown in FIG. 1 includes a video search server 102 operating on or in communication with a network 104 to provide video search functions to a client device 106. The video search server 102 is configured to execute an operating system (best illustrated in FIG. 12) and one or more application programs, such as a video search application 108 and/or other application programs. The video search application 108, in some embodiments, includes a video search engine with components for performing operations such as Web crawling, indexing, and searching for video content.

In some embodiments, the video search application 108 includes one or more Web crawlers (also called "Web spiders") configured to search or "crawl" the Web to obtain data pertinent to video search, including, for example, metadata and one or more still images that are representative of a given video (i.e., representative image), according to the various embodiments disclosed herein. In some embodiments, the video search application 108 is configured to index results obtained by the one or more Web crawlers to generate a video search index 110 and an anchor image storage 112. In some embodiments, the video search application 108 includes one or more Web pages containing user interface elements for facilitating user input of search query terms via the client device 106. The video search application 108 may also include other modules and components thereof, as will be described in greater detail below with reference to FIG. 2.

In the illustrated embodiment, the video search server 102 includes the video search application 108, the video search index 110, the anchor image storage 112, and a video entity template storage 114. The video search index 110 is configured to store a corpus of uniform resource locators ("URLs") for video pages in association with metadata extracted via various embodiments disclosed herein and anchor images identified via various embodiments disclosed herein.

Exemplary metadata includes, but is not limited to, title, description, publication or upload date, user view count, username of account associated with the upload of a given video, number of comments, number of like or dislike votes for a given video (e.g., thumbs up or thumbs down, etc.), video rating (e.g., five-star scale, 1-10 scale, proprietary scale, etc.), and other user-provided data. Individual metadata types are referred to herein as "entities." For example, a title is one type of entity, as is a publication date and a view count. These entities can be targets for extraction via the entity extraction methods disclosed herein.

The anchor image storage 112 is configured to store candidate anchor images from which an anchor image can be selected in accordance with various embodiments disclosed herein. Anchor images are images that have been selected for display as the representative image for a video. Candidate anchor images are representative images that can be selected for a video.

The video entity template storage 114 is configured to store video entity templates generated in accordance with various embodiments disclosed herein. Video entity templates define common features that relate to various entities shared among a group of video Web pages. In some embodiments, each of the Web pages in the group is associated with a single Web site, such as a video hosting Web site. In other embodiments, one or more of the Web pages in the group is associated with a different Web site. Common features defined by a video entity template may include, but are not limited to, hypertext markup language ("HTML") features, page layout features (e.g., size and/or position of one or more page elements), term use that is indicative of a particular entity (e.g., terms such as "view count" or "upload date" may be indicative of such entities), in any combination thereof, and the like. Additional details of the component of the video search server 102 will become apparent from the balance of this disclosure.

Although the video search application 108, the video search index 110, the anchor image storage 112, and the video entity template storage 114 are illustrated as components of the video search server 102, it should be understood that each of these components, or combinations thereof, may be embodied as or in stand-alone devices or components thereof operating on or in communication with the network 104 and/or the video search server 102. Thus, the illustrated embodiment is exemplary, and should not be construed as being limiting in any way.

The video search server 102 is configured to communicate with the client device 106 over the network 104 to receive a video search query 116. In response to receiving the video search query 116, the video search application 108 is configured to process the video search query 116 by parsing the one or more search terms taking into consideration any Boolean operators used to define the relationship between the search terms, compare the search terms to the video search index 110, and return a video search query result 118 including metadata and a representative image for one or more videos that are relevant to the search terms. The representative image(s) are anchor images selected for the one or more videos.

In some embodiments, a representative image included in the video search query result 118 identifies a video page that is host to the video associated with the metadata and representative image using a URL. In some embodiments, the video search result 118 is ordered by relevance to the search terms. In some embodiments, the video search result 118 is grouped according to categories or categories and one or more sub-categories. The video search result 118 can be displayed via a Web browser application 120 of the client device 106.

According to various embodiments, the client device 106 is a personal computer ("PC") such as a desktop, tablet, or laptop computer system. The client device 106 may include other types of computing systems including, but not limited to, server computers, handheld computers, netbook computers, embedded computer systems, personal digital assistants, mobile telephones, smart phones, or other computing devices.

The client device 106 includes the Web browser application 120, a video player application 122, a video codec 124, and an operating system 126. The Web browser application 102 is configured to request, receive, and display information pages, such as Web pages, from the video search server 102. In particular, the browser 120 is configured to establish a connection with the video search application 108 executing on the video search server 102. Through the connection, the browser 120 may request a Web page for executing the video search query 116 provided by the video search application 108. Through the Web page, a user of the client device 106 can specify one or more search terms to be utilized by the video search application 108 in a search of the video search index 110.

The video player application 122, in some embodiments, is a plug-in or add-on component to the browser 120 that allows videos to be played in an embedded video player displayed within the browser 120. In other embodiments, the video player application 122 is a stand-alone application that allows videos to be played in a video player executed separately from the browser 120. In any case, the video player application 122 is configured to play videos found in a video search on the client device 106 in accordance with one or more video codecs 124.

The operating system 126 is a computer program for controlling the operation of the client device 106. The browser application 120 and the video player application 122 are executable programs configured to execute on top of the operating system 126 to provide the functionality described above.

FIG. 1 illustrates one video search application 102, one network 104, one client device 106, one video search query 116, and one video search query result 118. It should be understood, however, that some implementations of the operating environment 100 include multiple video search applications 102, multiple networks 104, multiple client devices 106, multiple video search queries 116, and/or multiple video search query results 118. Thus, the illustrated embodiments should be understood as being exemplary, and should not be construed as being limiting in any way.

Figure 2:
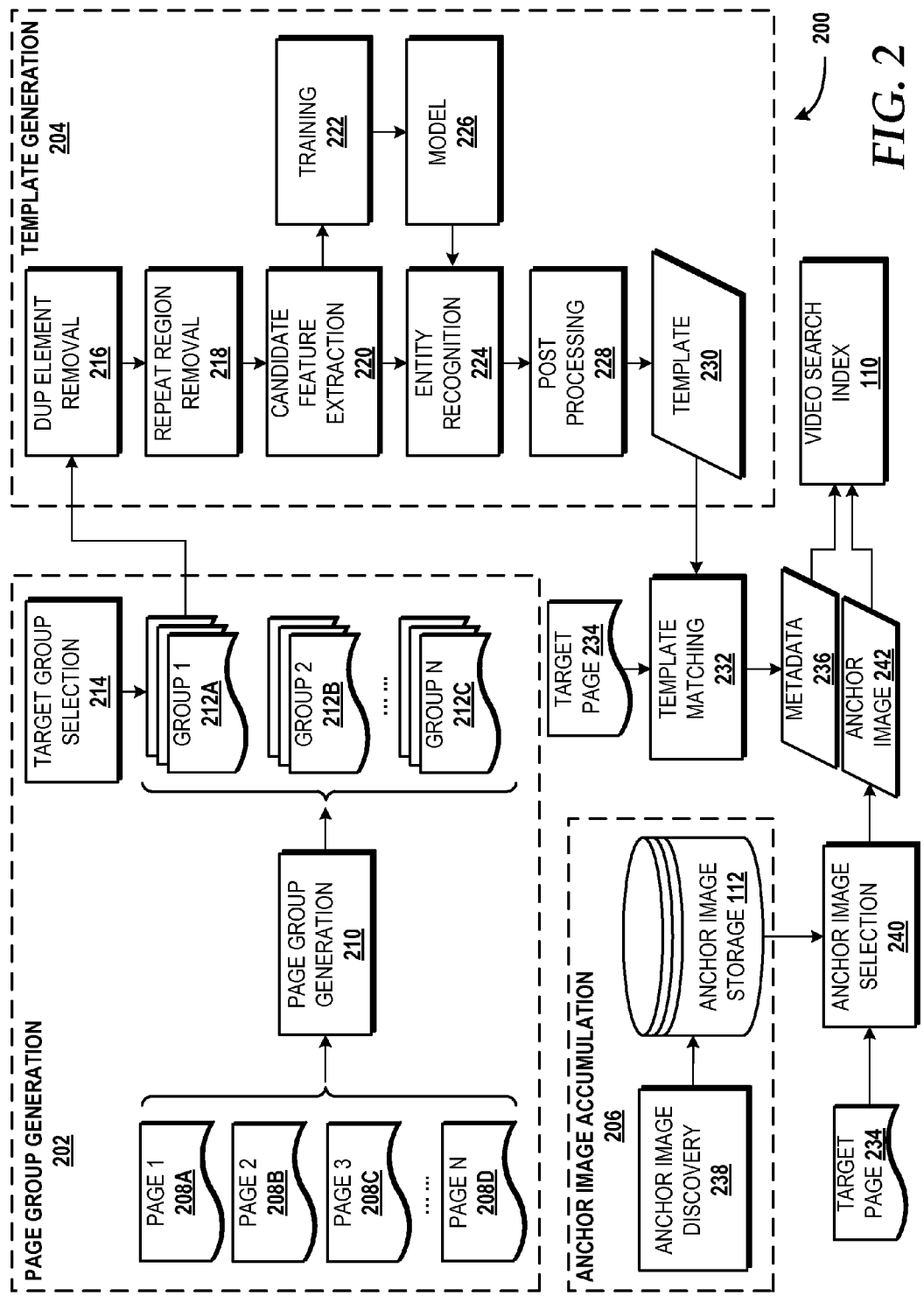
FIG. 2 is a diagram illustrating an exemplary modular overview for various application modules and components thereof that are executed by a video search server for the various embodiments disclosed herein.

Turning now to FIG. 2, a modular overview 200 of various operations performed by the video search application 108 to facilitate extraction of metadata and identification of anchor images within Web pages will be described. In particular, the illustrated modular overview 200 includes three modules 202, 204, 206 directed, respectively, to various operations, the execution of which facilitate page group generation, template generation, and an anchor image accumulation for the video search application 108. The page group generation module 202 will now be described.

Figure 12:
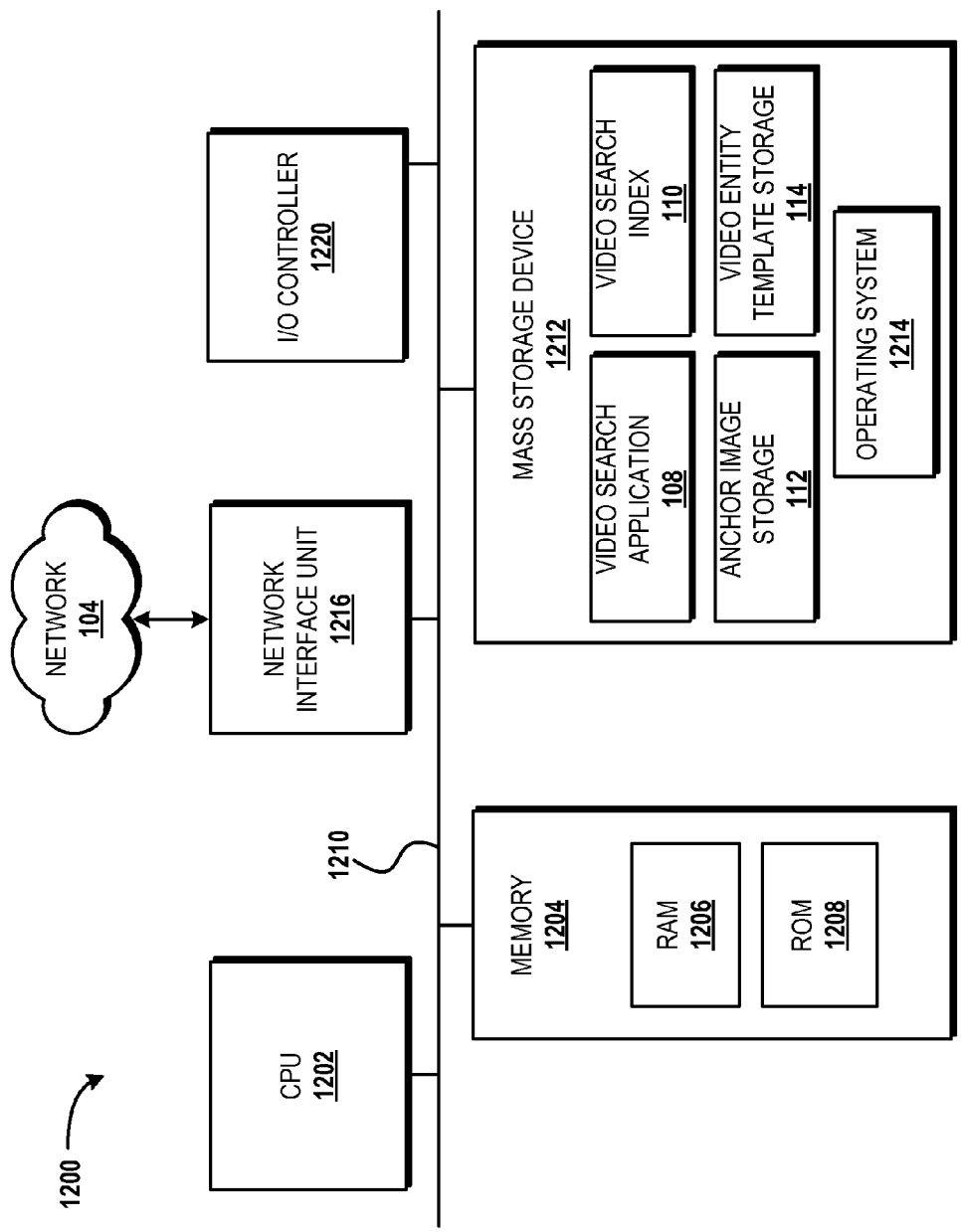
FIG. 12 is a computer architecture diagram illustrating an exemplary computer hardware and software architecture for a computing system capable of implementing aspects of the embodiments presented herein.

The illustrated page group generation module 202 includes a plurality of Web pages 208A-208D, which may be associated with one or more Web sites. For ease of explanation, consider the pages 208A-208D as being associated with a single target Web site, for example, a video hosting Web site such as YOUTUBE, VIMEO, or the like, from which the video search application 108 is instructed to extract metadata. The target Web site, in some embodiments, is provided to the video search application 108 via a direct user input (e.g., via an input interface of the video search server 102 as best illustrated in FIG. 12). In some embodiments, the target Web site is provided to the video search application 108 via one or more URL seeds of a target URL list, for example, to the Web crawler component of the video search application 108. In some embodiments, the target Web site is provided to the video search application 108 based upon a target video page pattern. A video page pattern includes, for example, an arrangement of a video Web page. A target video page pattern may be a particular video page pattern that is known to be used by one or more target Web sites.

The pages 208A-208D are provided as input to a page group generation component 210. The page group generation component 210 groups the pages 208A-208D into one or more groups according to common visual layout. For instance, suppose pages 208A and 208B include a video section, a comments section, and a related videos section, and a view count section arranged in the same way. Since pages 208A and 208B are arranged in this manner, these pages are considered to share a common visual layout and are accordingly grouped together.

In the illustrated embodiments, the pages 208A-208D are grouped into three groups 212A-212C in this manner, although more or less groups are contemplated. Assuming the page group generation component 210 groups the pages 208A-208D into two or more groups, a target group selection component 214 selects a one of the groups 208A-208D as the target (i.e., the target group) from which to generate a video entity template. In some embodiments, the target group is selected by leveraging video page classification technology, as those skilled in the art would understand. In the illustrated embodiment, the target group selection component 214 has selected group 1 212A as the target group. After the target group selection component 214 selects a target group, the target group is provided as input to the template generation module 204, which is now described in detail.

The template generation module 204 is generally configured to generate a video entity template. A video entity template defines common features that relate to various metadata types (also referred to herein as entities) shared among a group of video Web pages. The group of video Web pages may belong to one or more Web sites. Common features may include, for example, hypertext markup language HTML features, term use that is indicative of a particular metadata type, and/or page layout features. The features that are considered to be associated with various entities are described herein below.

The illustrated template generation module 204 includes a duplicate element removal component 216 and a repeat region removal component 218 that are configured to remove unnecessary and/or noisy areas of pages within the target group that are likely not to contain metadata. The duplicate element removal component 216 and the repeat region removal component 218 may be executed sequentially as illustrated, sequentially with the repeat region removal component 218 being executed first, or simultaneously. Furthermore, these components may be combined.

The duplicate element removal component 216 removes elements that are shared among pages in the target group. These elements are referred to herein as common elements. Common elements may include, for example, page headers, page footers, navigation bars, and the like. The repeat region removal component 218 removes repeat regions of pages in the target group. Repeat regions are portions of pages that are repeated within pages in the target group. Repeat regions may include, but are not limited to, related video sections, comments sections, and advertising regions. The removal of repeat regions further isolates metadata under an assumption that such data cannot or typically would not be presented in such regions of a video page.

After the duplicate element removal component 216 and the repeat region removal component 218 are executed, the resultant region is provided as input to a candidate feature extraction component 220. The resultant region is considered a candidate region in which one or more features reside. The one or more features contained within a candidate region are referred to herein as candidate features. Candidate features may vary based upon the target entity for extraction, as will be described herein.

It should be understood that region removal, in some embodiments, is particular to the target entity for extraction. Publication dates and view counts, for example, typically exist in small repeat regions in close proximity to other entities such as title. As a result, these repeat regions may be considered exceptions by the components 216, 218. These exceptions are described in greater detail below with respect to the flow diagrams illustrated in FIGS. 6 and 7 for publication date and view count entity extraction.

The candidate feature extraction component 220 is configured to extract candidate features from the candidate region based upon one or more attributes of a given target entity. A title entity (i.e., the title of a video), for example, may be the same as the title for a given page, or may contain a common prefix or suffix among pages in the target group. This "feature" can be used as an indicator to identify a title entity from HTML content of a given page. Other HTML features such as <H1>, <strong>, and the like may be used to identify a title entity in the HTML content. A publication date also has some specific features including a particular date pattern such as "Month.Day.Year," "Month/Day/Year," "Month Day Year," variations thereof with the "Day" or "Year" leading, and the like. These features can be extracted by a predefined date format extractor that is configured to search for dates within pages that are displayed in accordance with one or more date patterns. Other pages may not have a particular publication date or may utilize another format such as "Date Added: X hours/days ago." In some embodiments, the date format extractor is configured to search for alternative conventions that effectively identify a time at which a particular video was uploaded or published to a host. Methods for title entity extraction, publication date entity extraction, and view count entity extraction are illustrated and described, respectively, herein below with reference to FIGS. 5-7.

In the illustrated embodiment, candidate features extracted by the candidate feature extraction component 220 are provided to a training component 222 and/or an entity recognition component 224. The training component 222 uses a machine learning approach to learn the candidate features against a training data set in accordance with a machine learning model 226, for example, a support vector machine ("SVM") or other machine learning method known to those skilled in the art.

In some embodiments, the entity recognition component 224 is configured to utilize the machine learning model 226 to make a final determination regarding which entity corresponds to which candidate feature of the extracted candidate features. In some embodiments, the final determination made by the entity recognition component 224 is validated via a post processing component 228. The post processing component 228 is configured to cross-validate the final determination by checking the results within one or more page groups to verify that the target entities are valid across pages within the target group. If the cross-validation fails, the post processing component 228 may request re-recognition by the entity recognition component 220. Otherwise, if the cross-validation is successful, the final output of the template generation module 204 is a video entity template 230 including which features (e.g., HTML features) correspond to which target entities for pages within the target group. A method for post-processing is illustrated and described herein below with reference to FIG. 8.

In the illustrated embodiment, the video entity template 230 is provided to a template matching component 232. In some embodiments, the template matching component 232 receives a target page 234 as input and matches an appropriate template (e.g., the video entity template 230 or another template previously generated) thereto to determine metadata 236 of the target page 234. The metadata 236 can then be provided to the video search index 110 for use in populating search results in response to a search query (e.g., the search query 116) received by the video search application 108.

Turning now to the anchor image accumulation module 206, the anchor image accumulation module 206 includes components for executing operations related to the accumulation of anchor image candidates for a given video. Specifically, an anchor image discovery component 238 may be executed to locate an image link during a Web crawling operation. The anchor image discovery component 238 checks if an image link found during the Web crawling operation points to (i.e., links to) a video Web page. In other words, the anchor image discovery component 238 checks if an image link found during the Web crawling operation points to a Web page having a video page pattern associated therewith. If the image link points to a video page pattern, the image link is associated with a target video page (e.g., the target page 234). For example, if image A contains a link to page B, image A is stored in association with page B in the anchor image storage 112. An anchor image selection component 240 then applies one or more rules to determine whether a particular image can be selected. The resultant image is an anchor image 242 for the target page 234 and is provided to the video search index 110. Methods for accumulating candidate anchor images, generating anchor image rules, and filtering candidate anchor images for selection based upon the rules are described herein below with respect to FIGS. 9-11.

Figure 3:
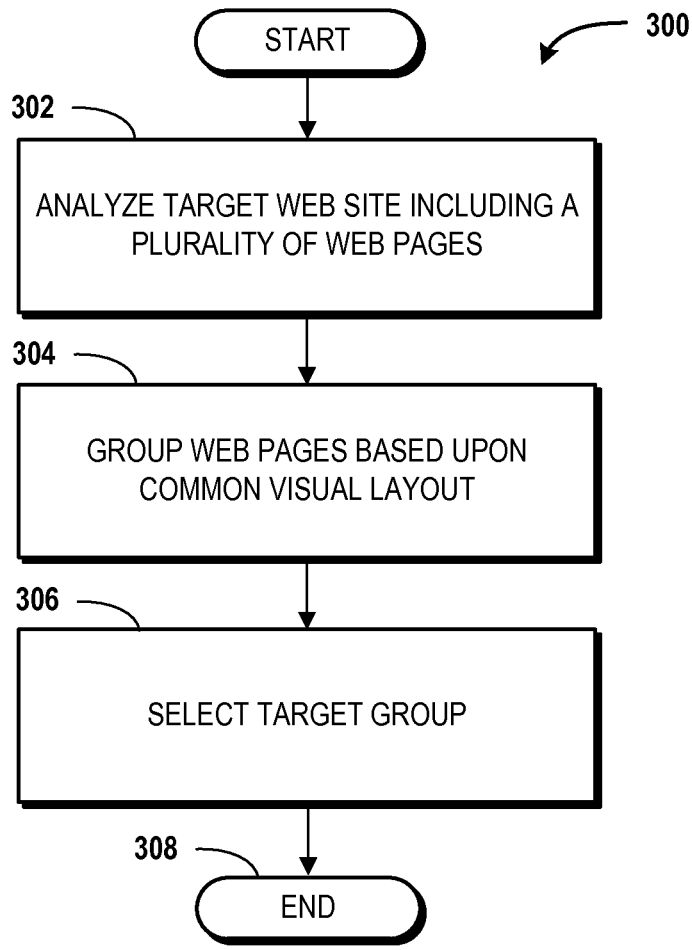
FIG. 3 is a flow diagram showing aspects of a method for generating page groups, according to an exemplary embodiment.

Turning now to FIG. 3, aspects of a method 300 for generating page groups will be described in detail. It should be understood that the operations of the methods disclosed herein are not necessarily presented in any particular order and that performance of some or all of the operations in an alternative order(s) is possible and is contemplated. The operations have been presented in the demonstrated order for ease of description and illustration. Operations may be added, omitted, and/or performed simultaneously, without departing from the scope of the appended claims.

It also should be understood that the illustrated methods can be ended at any time and need not be performed in their respective entireties. Some or all operations of the methods, and/or substantially equivalent operations, can be performed by execution of computer-readable instructions included on a computer-storage media, as defined below. The term "computer-readable instructions," and variants thereof, as used in the description and claims, is used expansively herein to include routines, applications, application modules, program modules, programs, components, data structures, algorithms, and the like. Computer-readable instructions can be implemented on various system configurations, including single-processor or multiprocessor systems, minicomputers, mainframe computers, personal computers, hand-held computing devices, processor-based, programmable consumer electronics, combinations thereof, and the like.

Thus, it should be appreciated that the logical operations described herein are implemented (1) as a sequence of computer-implemented acts or program modules running on a computing system and/or (2) as interconnected machine logic circuits or circuit modules within the computing system. The implementation is a matter of choice dependent on the performance and other requirements of the computing system. Accordingly, the logical operations described herein are referred to variously as states, operations, structural devices, acts, or modules. These operations, structural devices, acts, and modules may be implemented in software, in firmware, in special purpose digital logic, and any combination thereof.

For purposes of illustrating and describing the concepts of the present disclosure, the methods disclosed herein are described as being performed by the video search application 108 executing on the video search server 102 and, in some instances, more particularly, the application modules 202, 204, 206 or specific components thereof illustrated and described above with reference to FIG. 2. It should be understood that these embodiments are exemplary, and should not be viewed as being limiting in any way. The method 300 is now described with reference to FIG. 2 for further ease of description and illustration. The method 300 includes operations performed by the page group generation module 202 of the video search application 108 upon being executed by the video search server 102.

The method 300 begins and proceeds to operation 302, wherein a target Web site including a plurality of Web pages (e.g., the pages 208A-208D) is analyzed to determine which of the plurality of Web pages share a common visual layout. From operation 302, the method 300 proceeds to operation 304, wherein the Web pages are grouped based upon common visual layout. For example, for a given video hosting Web site (e.g., YOUTUBE), the Web pages associated with that Web site can be analyzed for common visual layout wherein regions such as header, footer, navigation bar, video placeholder, comments region, ratings region, related video region, and the like are shared among pages that contain video within the Web site.

It should be understood that some Web sites may have Web pages that share a common URL pattern, but have a different visual layout. Thus, grouping the pages based upon common visual layout instead of common URL pattern filters potentially unrelated pages from the groups prior to further filtering, post group page generation operations. From operation 304, the method 300 proceeds to operation 306, wherein a target group is selected. From operation 306, the method 300 proceeds to operation 308. The method 300 ends at operation 308.

Figure 4:
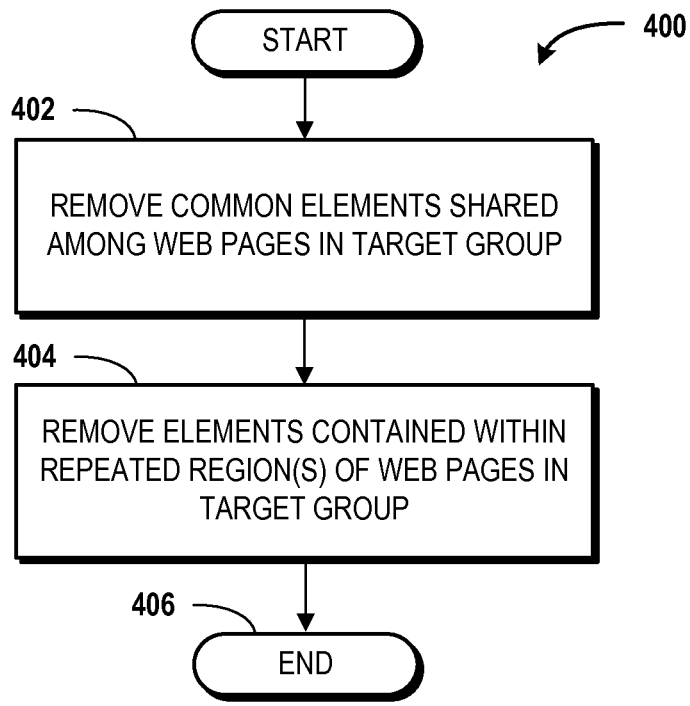
FIG. 4 is a flow diagram showing aspects of a method for deduplicating data contained in Web pages of a selected target group to define a candidate region for feature extraction, according to an exemplary embodiment.

Turning now to FIG. 4, aspects of a method 400 for deduplicating data contained in the Web pages of the selected target group will be described with reference to FIG. 2 for further ease of description and illustration. The method 400 includes operations performed by the template generation module 204 of the video search application 108 upon being executed by the video search server 102. More particularly, the method 400 includes operations performed by the duplicate element removal component 216 and/or the repeat region removal component 218.

The method 400 begins and proceeds to operation 402, wherein common page elements shared among Web pages in the target group are removed. Common elements such as header, footer, navigation bar, and the like can be removed at operation 402. From operation 402, the method 400 proceeds to operation 404, wherein common page elements that are contained within one or more repeated regions of the Web pages in the target group are removed. The resultant pages include a candidate region containing page elements that are considered likely to be associated with videos. From operation 404, the method 400 proceeds to operation 406. The method 400 ends at operation 406.

Figure 5:
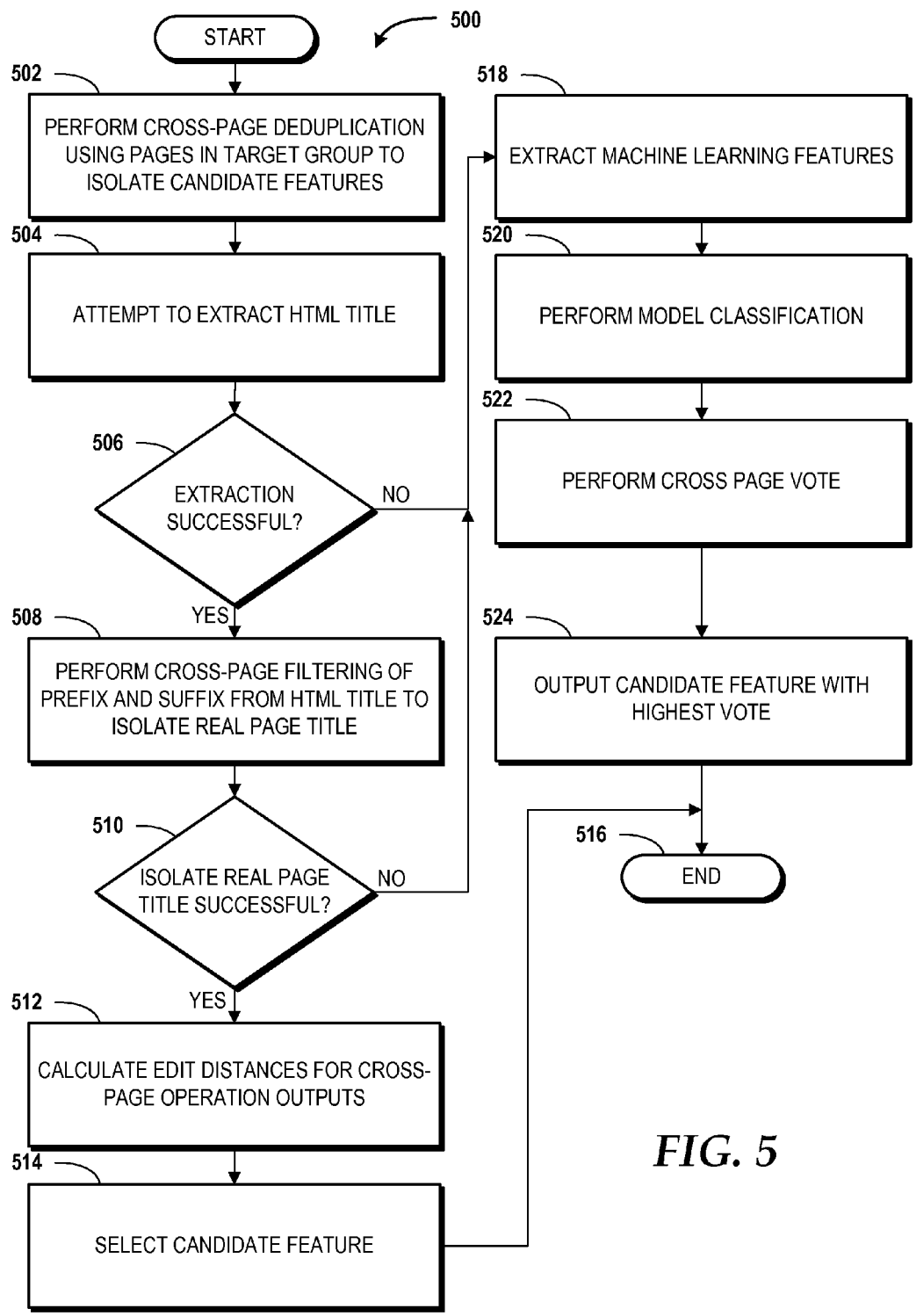
FIG. 5 is a flow diagram showing aspects of a method for title extraction, according to an exemplary embodiment.

Turning now to FIG. 5, aspects of a method 500 for title entity extraction within a candidate region will be described with reference to FIG. 2 for further ease of description and illustration. The method 500 includes operations performed by the template generation module 204 of the video search application 108 upon being executed by the video search server 102. More particularly, the method 500 includes operations performed by the candidate feature extraction component 220, the training component 222, the entity recognition component 224, and/or the machine learning model 226.

In some video pages, the HTML page title is also the video title or it contains the video title together with some common prefix or suffix. This attribute of video titles can be used to extract the page title entity for a given page as a candidate feature. Titles in video pages also likely have some strong HTML features, such as <H1>, <strong>, and/or the like. These attributes of video titles can additionally or alternatively be used to identify and extract candidate features for titles. In some embodiments, the HTML page title is extracted for a given page within the target group and is compared to the HTML page titles of other pages within the target group to filter any common prefix or suffix shared among the HTML page titles. The resultant filtered title can then be identified as the real page title and a true candidate feature. If the HTML page titles are the same, however, the HTML titles may be extracted and provided to the machine learning model 226 for consideration as part of a machine learning data set.

The method 500 begins and proceeds to operation 502, wherein cross-page deduplication is performed on the pages in the target group to isolate candidate features. From operation 502, the method 500 proceeds to operation 504, wherein extraction of the HTML page title is attempted. From operation 504, the method 500 proceeds to operation 506, wherein it is determined if extraction of the HTML title is successful. If extraction of the HTML page title is successful, the method 500 proceeds from operation 506 to operation 508, wherein cross-page filtering of prefix and/or suffix from the extracted HTML page title is performed to isolate a real page title sans any prefix and/or suffix share among pages in the target group.

From operation 508, the method 500 proceeds to operation 510, wherein it is determined if isolating the real page title is successful. Isolating the real page title is successful if the extracted HTML titles have common prefix or common suffix. If isolating the real page title is successful, the method 500 proceeds from operation 510 to operation 512, wherein an edit distance between the cross-page operation outputs (i.e., the outputs of operations 502, 508) is calculated. From operation 512, the method 500 proceeds to operation 514, wherein one of the candidate features is selected based at least in part upon the edit distance calculated in operation 512. From operation 514, the method 500 proceeds to operation 516. The method 500 ends at operation 516.

If isolating the real page title is not successful as determined at operation 510 or if the HTML page title is not successfully extracted as determined at operation 506, the method 500 proceeds to operation 518, wherein the candidate features are added to a training data set of the machine learning model 226. From operation 518, the method 500 proceeds to operation 520, wherein the candidate features are classified according to the model. In the illustrated embodiment, these candidate features are classified for title entity extraction. From operation 520, the method 500 proceeds to operation 522, wherein a cross-page vote is performed on the candidate features. From operation 522, the method 500 proceeds to operation 524, wherein the candidate feature with the highest vote (e.g., most common candidate feature among the candidate features in the pages of the target group) is selected and output as the candidate feature for extraction as the title entity within the target group. From operation 524, the method 500 proceeds to operation 516. The method 500 ends at operation 516.

Figure 6:
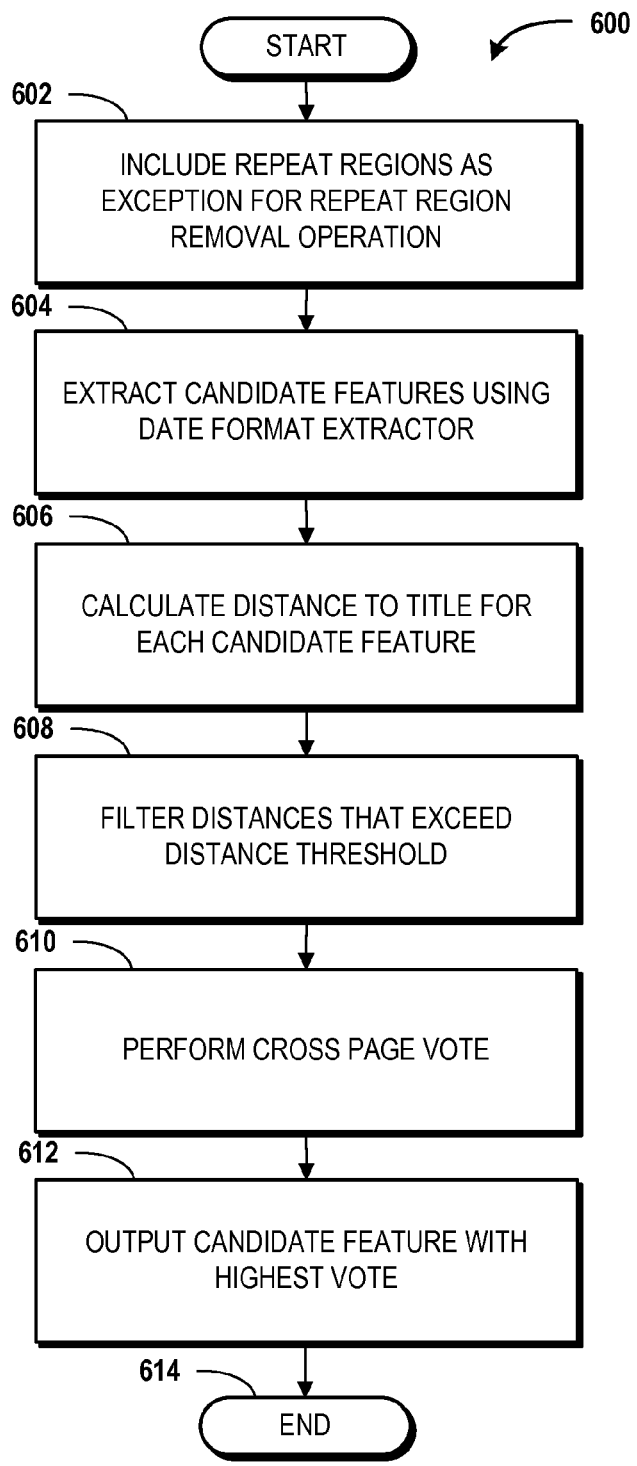
FIG. 6 is a flow diagram showing aspects of a method for publication date extraction, according to an exemplary embodiment.

Turning now to FIG. 6, aspects of a method 600 for publication date extraction within a candidate region will be described with reference to FIG. 2 for further ease of description and illustration. The method 600 includes operations performed by the template generation module 204 of the video search application 108 upon being executed by the video search server 102. More particularly, the method 600 includes operations performed by the candidate feature extraction component 220, the training component 222, the entity recognition component 224, and/or the machine learning model 226.

A publication date (or upload date) for a given video may exist in a small repeat region of a video page. Accordingly, the method 600 begins and proceeds to operation 602, wherein during the repeat region removal operation (e.g., operation 404 of FIG. 4) certain region sizes are treated as exceptions so as not to be removed. These regions may include regions that are below a certain size threshold. It is contemplated that the size threshold can be trained over time and adjusted to include region sizes that have been found to typically include publication dates for videos. In some instances, the region size exception is for region sizes that include the publication date within a threshold distance of the title or other entity of interest. In any case, the method 600 considers repeat regions that are likely to include a publication date.

From operation 602, the method 600 proceeds to operation 604, wherein candidate features are extracted using a date format extractor. It is contemplated that the date format extractor can target any number of date formats including various formats that start with the day, the month, or the year. From operation 604, the method 600 proceeds to operation 606, wherein a distance to the title is calculated for each candidate feature. The distance may be measured in pixels, inches, or some other unit of measurement.

From operation 606, the method 600 proceeds to operation 608, wherein distances that exceed a distance threshold are filtered such that the candidate features associated with the remaining distances have a higher probability of being the publication date. From operation 608, the method 600 proceeds to operation 610, wherein a cross-page vote is performed on the candidate features.

From operation 610, the method 600 proceeds to operation 612, wherein the candidate feature with the highest vote (e.g., most common candidate feature among the candidate features in the pages of the target group) is selected and output as the candidate feature for extraction as the publication date entity within the target group. From operation 612, the method 600 proceeds to operation 614. The method 600 ends at operation 614.

Figure 7:
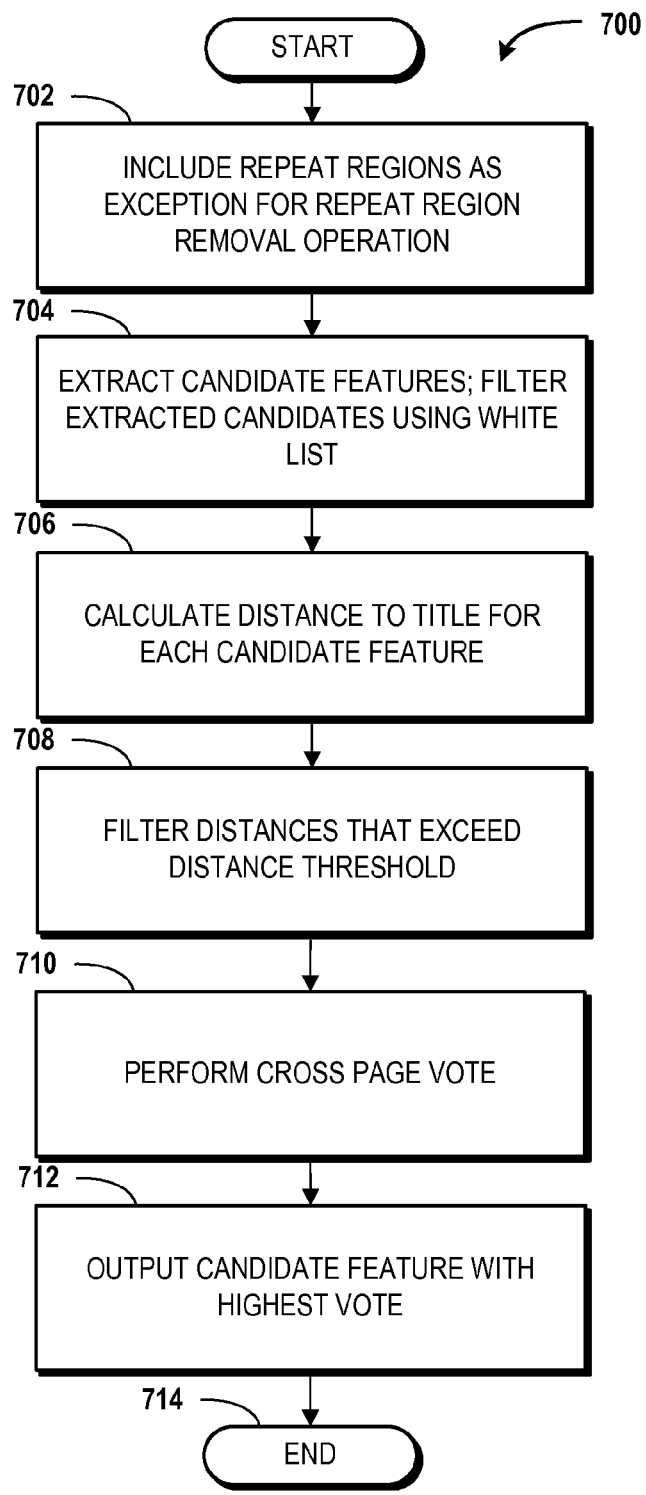
FIG. 7 is a flow diagram showing aspects of a method for view count extraction, according to an exemplary embodiment.

Turning now to FIG. 7, aspects of a method 700 for view count extraction within a candidate region will be described with reference to FIG. 2 for further ease of description and illustration. The method 700 includes operations performed by the template generation module 204 of the video search application 108 upon being executed by the video search server 102. More particularly, the method 700 includes operations performed by the candidate feature extraction component 220, the training component 222, the entity recognition component 224, and/or the machine learning model 226.

View count is a number, which is very similar to other numbers typically found in a video page, such as number of votes, number of users that have identified the video as a favorite, the number of comments, and the like. For this reason it is historically difficult to distinguish the view count of a given video from other numerical metadata associated with that video. The method 700 for view count extraction utilizes a white list of terms that are typically associated with a view count. This white list may be updated from time to time to include new terms. Furthermore, although a white list is described with particular reference to view counts, other numerical entities can be extracted using a similar methodology.

The method 700 begins and proceeds to operation 702, wherein during the repeat region removal operation (e.g., operation 404 of FIG. 4) certain region sizes are treated as exceptions so as not to be removed. These regions may include regions that are below a certain size threshold. It is contemplated that the size threshold can be trained over time and adjusted to include region sizes that have been found to typically include view counts for videos. In some instances, the region sizes exception is for region sizes that include the view count within a threshold distance of the title or other entity of interest. In any case, the method 700 considers repeat regions that are likely to include a view count.

From operation 702, the method 700 proceeds to operation 704, wherein candidate features are extracted. In some embodiments, the candidate features are extracted utilizing a digital format extractor. The digital format extractor is utilized to extract features such as video count candidates by recognizing a common view count format. Some examples of view count formats include, but art not limited to, "123456", "123,456", and "(123456)". The candidate features may then be filtered by a white list.

From operation 704, the method 700 proceeds to operation 706, wherein a distance to the title is calculated for each candidate feature. The distances may be measured in pixels, inches, or some other unit of measurement. From operation 706, the method 700 proceeds to operation 708, wherein distances that exceed a distance threshold are filtered such that the candidate features associated with the remaining distances have a higher probability of being the view count. From operation 708, the method 700 proceeds to operation 710, wherein a cross-page vote is performed on the candidate features. From operation 710, the method 700 proceeds to operation 712, wherein the candidate feature with the highest vote (e.g., most common candidate feature among the candidate features in the pages of the target group) is selected and output as the candidate feature for extraction as the view count entity within the target group. From operation 712, the method 700 proceeds to operation 714. The method 700 ends at operation 714.

Figure 8:
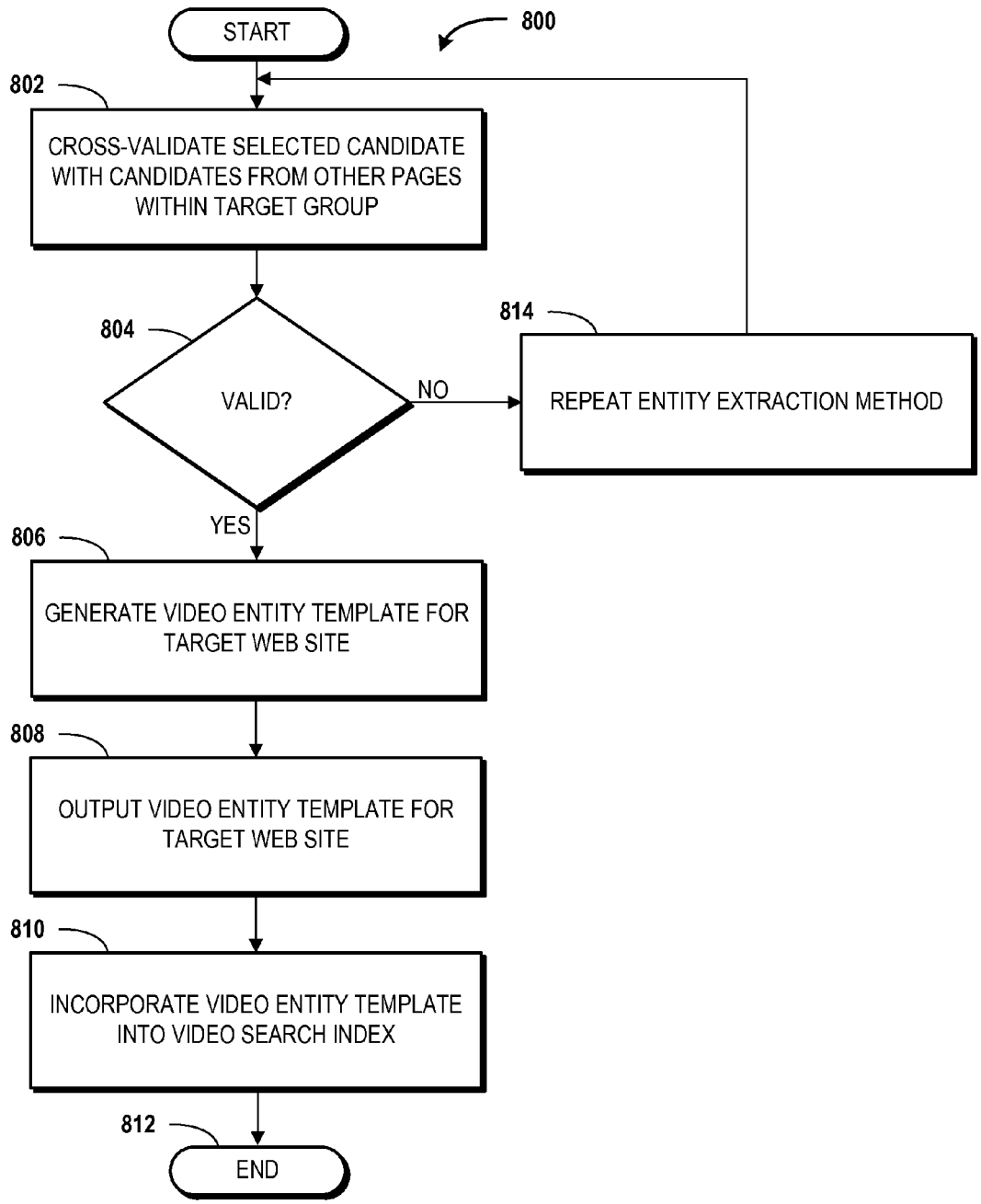
FIG. 8 is a flow diagram showing aspects of a method for post-processing after entity extraction, according to an exemplary embodiment.

Turning now to FIG. 8, aspects of a method 800 for post-processing after entity extraction will be described with reference to FIG. 2 for further ease of description and illustration. The method 800 includes operations performed by the template generation module 204 of the video search application 108 upon being executed by the video search server 102. More particularly, the method 500 includes operations performed by the post processing component 228. The selected candidate feature provided as output of one of the entity extraction methods 500, 600, 700 is considered as input to the method 800.

The method 800 begins and proceeds to operation 802, wherein the selected candidate feature is cross-validated with candidate features of other pages within the target group. From operation 802, the method 800 proceeds to operation 804, wherein it is determined if the selected candidate feature is valid as determined through the cross-validation. If it is determined at operation 804 that the selected candidate feature is valid, the method 800 proceeds to operation 806, wherein a video entity template is generated including an indication of which pages elements correspond to which entities for a given video page in the target Web site.

From operation 806, the method 800 proceeds to operation 808, wherein the video entity template is output. From operation 808, the method 800 proceeds to operation 810, wherein the video entity template is incorporated into the video search index 110 such that future video pages from the target Web site can be analyzed and the metadata corresponding to various entities can be efficiently extracted. From operation 810, the method 800 proceeds to operation 812. The method 800 ends at operation 812.

If it is determined at operation 804 that the selected candidate feature is not valid, the method 800 proceeds to operation 814, wherein the appropriate entity extraction method (e.g., for title entity extraction, method 500; for publication date entity extraction, method 600; for view count entity extraction, method 700) is repeated. Cross-validation in accordance with the method 800 may then be repeated as illustrated.

Figure 9:
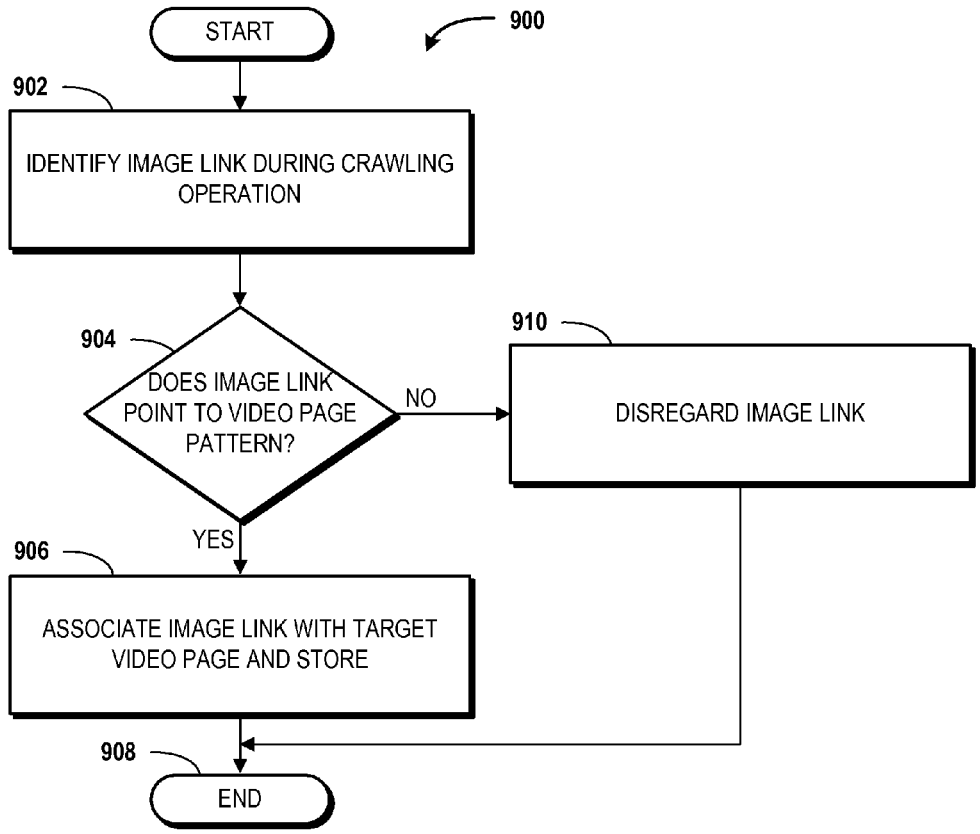
FIG. 9 is a flow diagram showing aspects of a method for accumulating candidate anchor images, according to an exemplary embodiment.

Turning now to FIG. 9, aspects of a method 900 for accumulating candidate anchor images will be described. The method 900 includes operations performed by the anchor accumulation module 206 of the video search application 108 upon being executed by the video search server 102. More particularly, the method 900 includes operations performed by the anchor image discovery component 238.

The method 900 begins and proceeds to operation 902, wherein an image link is identified during a crawling operation performed by one or more Web crawlers of the video search application 108. A video list is one possible source for candidate anchor images, so the crawling operation could focus on lists, such as those included within different channels of a video site. Other lists are provided based upon some criteria such as most views (i.e., most popular), most recent, least recent, highest rated, lowest rated, and the like. The crawling operation may also consider these lists. Another source for candidate anchor images is inside video pages such as under a related videos section wherein images and corresponding links are often displayed. In general, at operation 902, the Web crawlers are instructed to find all images that have a link to a certain target video page.

From operation 902, the method 900 proceeds to operation 904, wherein it is determined if the image link points to (i.e., links to) a video page pattern. In some embodiments, URLs that are associated with a video page pattern are identified through the page grouping operations performed by the group generation module 202. In some embodiments, it can be determined if a target URL is a video page or not by using the higher number of like images targeting the same URL as an indication that the probability of image A being associated with page B is very high. Over time, this information will accumulate nearly all the image for target URL. If it is determined that the image link points to a page containing a video page pattern, the image link is associated with the target page (i.e., the linked to page) and stored in the anchor image storage 112 as a candidate anchor image. From operation 906, the method 900 proceeds to operation 908. The method 900 ends at operation 908. If it is determined at operation 904 that the image link does not point to a page containing a video page pattern, the method 900 proceeds to operation 910, wherein the image link is disregarded. The method 900 then proceeds to operation 908, wherein the method 900 ends.

Figure 10:
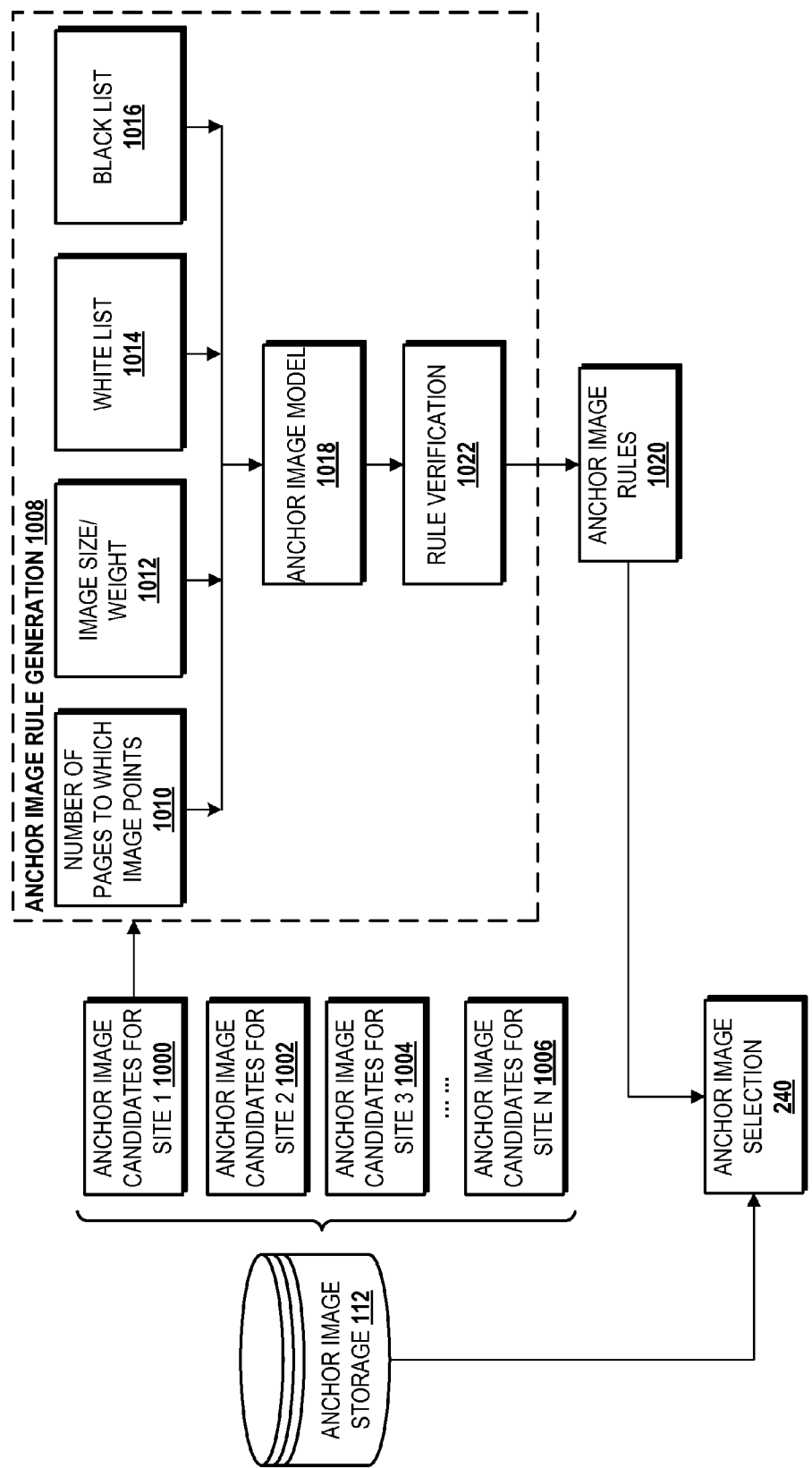
FIG. 10 is a diagram illustrating anchor image rule generation, according to an exemplary embodiment.

Turning now to FIG. 10, a diagram illustrating anchor image rule generation will be described. As illustrated, from the anchor image storage 112, anchor image candidates for various sites can be analyzed to perform anchor image rule generations based upon each site. In the illustrated embodiment, sets of anchor image candidates 1000, 1002, 1004, 1006 corresponding, respectively, to sites 1, 2, 3, and N are illustrated. By way of example, the set of anchor image candidates 1000 for site 1 is provided as input to an anchor image rule generation module 1008 to generate anchor image rules for site 1.

The illustrated anchor image rule generation module 1008 utilizes various factors to determine a probability of a given anchor image candidate within a set of anchor image candidates set being a good anchor image or a bad anchor image. Exemplary factors are illustrated as including a first factor 1010 of a number of video pages to which a given image points, a second factor 1012 of a size and weight of a given image, a third factor 1014 of whether a URL associated with a given image is explicitly included in or matches a pattern in a black list, and a fourth factor 1016 of whether a URL associated with a given image is explicitly included in or matches a pattern in a white list. The factors 1010, 1012, 1014, 1016 are considered by an anchor image model 1018 to generate one or more anchor image rules 1020, which may or may not be verified by a rule verification component 1022. The anchor image rules 1020 are then provided to the anchor image selection component 240 (described above with reference to FIG. 2). Those skilled in the art will appreciate other factors as being used to generate rules.

The first factor 1010 considers whether a given image points to too many video pages. This may be determined, for example, by determining a number of video pages to which the given image points and comparing the number to a threshold number of video pages. In some embodiments, the threshold number of video pages is any number as few as two video pages. For example, a threshold number of two may be arrived at under the assumption that two unique videos should have anchor images that uniquely identify each video and, accordingly, should not utilize an image that is shared among two or more video pages as the anchor image. For further example, an image used for a play button, rewind button, fast forward button, stop button, or pause button may be considered a bad anchor image since these types of images (i.e., control buttons) are likely to be shared among a number of video pages.

The second factor 1012 considers whether a given image is too small or too large. The determination of what is too small and too large may be based upon size constraints set by the video search server 102, a search engine provider, another computer system or device, or a third party. For example, size constraints may be set for compatibility with a search interface or for some other reason. If the given image is too small or too large, the given image may be considered a bad image.

The second factor 1012 also considers whether the weight of a given image. The weight may be the relative strength, heaviness, or darkness of the given image or a portion (e.g., a line) thereof against a background of the given image. The weight may be similar to those in terms of thinness or thickness of the image. Weight constraints may be set in a manner similar to the size constraints described above.

The third factor 1014 is a white list used to identify one or more image URL patterns and/or one or more specific URLs that are allowed. In some embodiments, image URL patterns included in a white list may include image URL patterns that indicate the associated image is hosted by a Web site that hosts videos.

The fourth factor 1016 is a black list used to identify one or more image URL patterns and/or one or more specific URLs that are not allowed. In some embodiments, image URL pattern rules included in a black list are prohibited URL patterns, such as URL patterns that indicate the associated image is being hosted by a non-trusted Web site (e.g., a site which may use inappropriate language in URLs or otherwise mislabel image URLs).

The rule verification component 1020 is used to verify whether a generated rule is good or not. In some embodiments, the verification component 1020 filters out rules which generate low quality images such as, but not limited to, black screen, gray screen, or color bar. What is considered to be a low quality image may be adjusted by the search engine provider or another party, and may be adjusted per Web site or per group of Web sites. If a rule is good, it is made available to the anchor image selection component 240 for consideration when performing anchor image selection, such as described in greater detail below with reference to FIG. 11.

Figure 11:
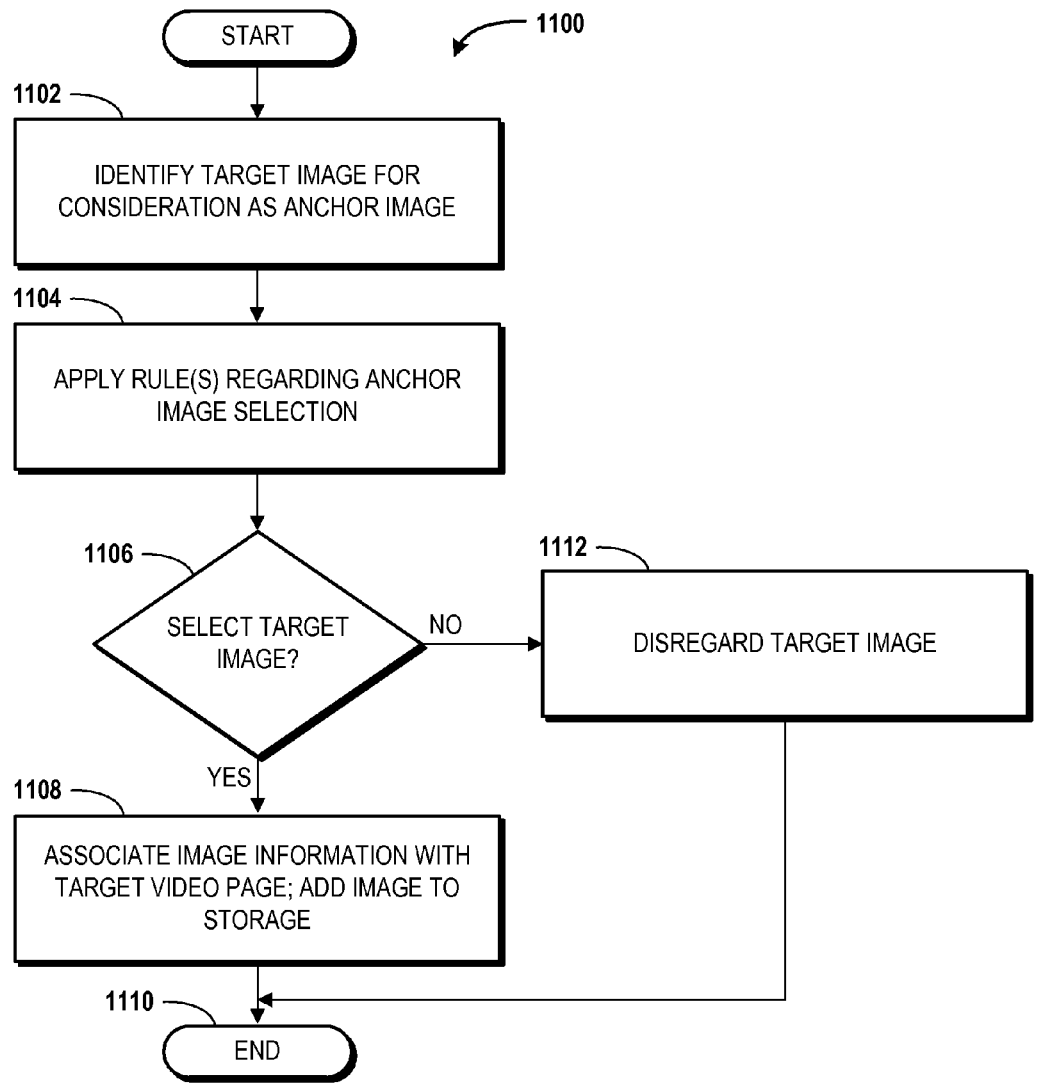
FIG. 11 is a flow diagram showing aspects of a method for filtering and selecting an anchor image from a set of candidate anchor images, according to an exemplary embodiment.

Turning now to FIG. 11, a flow diagram showing aspects of a method 1100 for filtering and selecting an anchor image from a set of candidate anchor images will be described. The method 1100 begins and proceeds to operation 1102, wherein a target image is identified for consideration as an anchor image for a target video page. Alternatively, a plurality of target images, each of which is identified as linking to the same target video page, are considered as candidate anchor images for the target video page. In any case, from operation 1102, the method 1100 proceeds to operation 1104, wherein one or more rules regarding the selection of an anchor image are applied.

Exemplary rules include, but are not limited to, rules related to image dimensions, image URL pattern, and text similarity within image to title of target video. Image dimension rules, in some embodiments, include minimum and/or maximum image dimensions such that candidate anchor images that do not at least meet the minimum image dimensions or those that exceed the maximum image dimensions are excluded from consideration as the target anchor image.

In some embodiments, image URL pattern rules include a white list of allowed URL patterns, for example, URL patterns that indicate the associated image being hosted by a Web site also hosting the target video. In other embodiments, image URL pattern rules include a black list of prohibited URL patterns, for example, URL patterns that indicate the associated image is being hosted by a non-trusted Web site (e.g., a site which may use inappropriate language in URLs or otherwise mislabel image URLs). Those skilled in the art will appreciate other rules as being applicable to filter images such that the filtered images are excluded from further consideration as the anchor image.

From operation 1104, the method 1100 proceeds to operation 1106, wherein it is determined if the target image should be selected as the anchor image. This determination is based at least partially upon the application of one or more rules in operation 1104. If the application of the rules does not exclude the target image, the method 1100 proceeds to operation 1108, wherein the target and information associated therewith is associated with the target video page. The target image can also be stored as the anchor image for the target video page. From operation 1108, the method 1100 proceeds to operation 1110. The method 1100 ends at operation 1110. If the application of the rules does exclude the target image, the method 1100 proceeds to operation 1112, wherein the target image is disregarded. The method 1100 then proceeds to operation 1110, wherein the method 1100 ends.

Turning now to FIG. 12, an exemplary computer architecture 1200 for a device capable of executing the software components described herein for data extraction and anchor image identification for video search. Thus, the computer architecture 1200 illustrated in FIG. 12 illustrates an architecture for a server computer (e.g., the video search server 102). The computer architecture 1200 may be utilized to execute any aspects of the software components presented herein, such as those illustrated and described above with respect to FIGS. 2-11.

The computer architecture 1200 illustrated in FIG. 12 includes a central processing unit 1202 ("CPU"), a system memory 1204, including a random access memory 1206 ("RAM") and a read-only memory ("ROM") 1208, and a system bus 1210 that couples the memory 1204 to the CPU 1202. A basic input/output system containing the basic routines that help to transfer information between elements within the computer architecture 1200, such as during startup, is stored in the ROM 1208. The computer architecture 1200 further includes a mass storage device 1212 for storing an operating system 1214, the video search application 108, the video search index 110, the anchor image storage 112, and the video entity template storage 114.

The mass storage device 1212 is connected to the CPU 1202 through a mass storage controller (not shown) connected to the bus 1210. The mass storage device 1212 and its associated computer-readable media provide non-volatile storage for the computer architecture 1200. Although the description of computer-readable media contained herein refers to a mass storage device, such as a hard disk or CD-ROM drive, it should be appreciated by those skilled in the art that computer-readable media can be any available computer storage media or communication media that can be accessed by the computer architecture 1200.

Communication media includes computer readable instructions, data structures, program modules, or other data in a modulated data signal such as a carrier wave or other transport mechanism and includes any delivery media. The term "modulated data signal" means a signal that has one or more of its characteristics changed or set in a manner as to encode information in the signal. By way of example, and not limitation, communication media includes wired media such as a wired network or direct-wired connection, and wireless media such as acoustic, RF, infrared and other wireless media. Combinations of any of the above should also be included within the scope of computer-readable media.

By way of example, and not limitation, computer storage media may include volatile and non-volatile, removable and non-removable media implemented in any method or technology for storage of information such as computer-readable instructions, data structures, program modules, application components, or other data. For example, computer media includes, but is not limited to, RAM, ROM, EPROM, EEPROM, flash memory or other solid state memory technology, CD-ROM, digital versatile disks ("DVD"), HD-DVD, BLU-RAY, or other optical storage, magnetic cassettes, magnetic tape, magnetic disk storage or other magnetic storage devices, or any other medium which can be used to store the desired information and which can be accessed by the computer architecture 1200. For purposes of the claims, the phrase "computer storage medium" and variations thereof, does not include waves, signals, and/or other transitory and/or intangible communication media, per se.

According to various embodiments, the computer architecture 1200 may operate in a networked environment using logical connections to remote computers through a network such as the network 104. The computer architecture 1200 may connect to the network 104 through a network interface unit 1216 connected to the bus 1210. It should be appreciated that the network interface unit 1216 also may be utilized to connect to other types of networks and remote computer systems, for example, other video search servers, databases, or data stores configured as redundant backup systems for the video search server 102 or multiples of the video search server 102 configured to provide greater capacity for video search functions. The computer architecture 1200 also may include an input/output controller 1218 for receiving and processing input from a number of other devices, including a keyboard, mouse, or electronic stylus (not shown in FIG. 12). Similarly, the input/output controller 1218 may provide output to a display screen, a printer, or other type of output device (also not shown in FIG. 12).

It should be appreciated that the software components described herein may, when loaded into the CPU 1202 and executed, transform the CPU 1202 and the overall computer architecture 1200 from a general-purpose computing system into a special-purpose computing system customized to facilitate the functionality presented herein. The CPU 1202 may be constructed from any number of transistors or other discrete circuit elements, which may individually or collectively assume any number of states. More specifically, the CPU 1202 may operate as a finite-state machine, in response to executable instructions contained within the software modules disclosed herein. These computer-executable instructions may transform the CPU 1202 by specifying how the CPU 1202 transitions between states, thereby transforming the transistors or other discrete hardware elements constituting the CPU 1202.

Encoding the software modules presented herein also may transform the physical structure of the computer-readable media presented herein. The specific transformation of physical structure may depend on various factors, in different implementations of this description. Examples of such factors may include, but are not limited to, the technology used to implement the computer-readable media, whether the computer-readable media is characterized as primary or secondary storage, and the like. For example, if the computer-readable media is implemented as semiconductor-based memory, the software disclosed herein may be encoded on the computer-readable media by transforming the physical state of the semiconductor memory. For example, the software may transform the state of transistors, capacitors, or other discrete circuit elements constituting the semiconductor memory. The software also may transform the physical state of such components in order to store data thereupon.

As another example, the computer-readable media disclosed herein may be implemented using magnetic or optical technology. In such implementations, the software presented herein may transform the physical state of magnetic or optical media, when the software is encoded therein. These transformations may include altering the magnetic characteristics of particular locations within given magnetic media. These transformations also may include altering the physical features or characteristics of particular locations within given optical media, to change the optical characteristics of those locations. Other transformations of physical media are possible without departing from the scope and spirit of the present description, with the foregoing examples provided only to facilitate this discussion.

In light of the above, it should be appreciated that many types of physical transformations take place in the computer architecture 1200 in order to store and execute the software components presented herein. It also should be appreciated that the computer architecture 1200 may include other types of computing devices, including hand-held computers, embedded computer systems, personal digital assistants, and other types of computing devices known to those skilled in the art. It is also contemplated that the computer architecture 1200 may not include all of the components shown in FIG. 12, may include other components that are not explicitly shown in FIG. 12, or may utilize an architecture completely different than that shown in FIG. 12.

Based on the foregoing, it should be appreciated that concepts and technologies for anchor image identification for video search have been disclosed herein. Although the subject matter presented herein has been described in language specific to computer structural features, methodological and transformative acts, specific computing machinery, and computer readable media, it is to be understood that the invention defined in the appended claims is not necessarily limited to the specific features, acts, or media described herein. Rather, the specific features, acts and mediums are disclosed as example forms of implementing the claims.

The subject matter described above is provided by way of illustration only and should not be construed as limiting. Various modifications and changes may be made to the subject matter described herein without following the example embodiments and applications illustrated and described, and without departing from the true spirit and scope of the present invention, which is set forth in the following claims.

We claim:

1. A computer-implemented method for accumulating candidate anchor images, the computer-implemented method comprising performing computer-implemented operations for:
   identifying, by a computer comprising one or more processors, an image link from a video list during a Web crawling operation performed by a Web crawler of a video search application, where the video list is included in a video site;
   determining, by the computer, if the image link points to a Web page having a video page pattern;
   disregarding, by the computer, the image link if it is determined that the image link does not point to a Web page having a video page pattern; and
   associating, by the computer, the image link with a Web page if it is determined that the image link does point to a Web page having a video page pattern.

2. The computer-implemented method of claim 1, wherein the video list is included in a channel of the video site, the channel comprising videos associated with a particular subject matter.

3. The computer-implemented method of claim 1, wherein the video list is included in a list created by the video site according to a sorting criterion, the sorting criterion comprising one of most viewed, most recent, least recent, highest rated, and lowest rated.

4. The computer-implemented method of claim 1, wherein the image link is a hyperlink associated with an image that is representative of a video contained within the Web page.

5. The computer-implemented method of claim 4, further comprising storing the image that is representative of the video contained within the Web page in a storage medium in association with the image link and the Web page, the storage medium comprising a plurality of candidate anchor images.

6. The computer-implemented method of claim 5, further comprising
   receiving a target page for analysis; and
   selecting the image as an anchor image for the target page from the storage medium.

7. A computer-implemented method for filtering and selecting an anchor image from a set of candidate anchor images, the computer-implemented method comprising performing computer-implemented operations for:
   identifying, by a computer comprising one or more processors, a target image from a video list for consideration as an anchor image for a target video page, wherein the video list is included in a video site;
   applying, by the computer, one or more rules regarding anchor image selection to the target image;
   based upon application of the one or more rules, determining, by the computer, if the target image should be selected as the anchor image;
   if it is determined that the target image should not be selected as the anchor image for the target video page, disregarding, by the computer, the target image; and
   if it is determined that the target image should be selected as the anchor image for the target video page, identifying, by the computer, the target image as the anchor image for the target video page.

8. The computer-implemented method of claim 7, wherein identifying the target image for consideration as the anchor image for the target video page comprises performing a Web crawling operation, a result of which identifies the target image as a candidate anchor image for the target video page.

9. The computer-implemented method of claim 7, wherein applying the one or more rules regarding anchor image selection comprises applying an image dimension rule, whereby if the target image does not at least meet a minimum image dimension or if the target image exceeds a maximum image dimension, it is determined that the target image should not be selected as the anchor image for the target video page.

10. The computer-implemented method of claim 7, wherein applying the one or more rules regarding anchor image selection comprises applying an image uniform resource locater ("URL") pattern rule, whereby if the target image is associated with a URL that conforms to a URL pattern that is included in a white list, it is determined that the target image should not be selected as the anchor image for the target video page.

11. The computer-implemented method of claim 7, wherein applying the one or more rules regarding anchor image selection comprises applying an image URL pattern rule, whereby if the target image is associated with a URL that does not conform to a URL pattern that is included in a white list or conforms to a URL pattern that is included in a black list, it is determined that the target image should not be selected as the anchor image for the target video page.

12. The computer-implemented method of claim 7, further comprising generating the one or more rules based upon one or more factors for a Web site to which the target video page belongs and verifying the one or more rules.

13. The computer-implemented method of claim 7, wherein applying the one or more rules regarding anchor image selection comprises applying a rule to determine whether the target image includes text that is the same as text included in a title of the target video page or a video contained therein., whereby if the target image includes text that is the same as text included in the title of the target video page or the video contained therein, it is determined that the target image should be selected as the anchor image for the target video page.

14. The computer-implemented method of claim 7, further comprising storing the target image as the anchor image for the target video page in a storage medium if it is determined that the target image should be selected as the anchor image for the target video page.

15. A computer storage medium that is not carrying a signal having computer readable instructions stored thereupon that, when executed by a computer, cause the computer to:
   identify an image link from a video list during a Web crawling operation performed by a Web crawler of a video search application, wherein the video list is included in a video site;
   determine if the image link points to a Web page having a video page pattern;
   disregard the image link if it is determined that the image link does not point to the Web page;
   associate the image link with the Web page if it is determined that the image link does point to the Web page;
   apply one or more rules regarding anchor image selection to a target image associated with the image link;
   based upon application of the one or more rules, determine if the target image should be selected as the anchor image;
   if it is determined that the target image should not be selected as the anchor image for the Web page, disregard the target image; and
   if it is determined that the target image should be selected as the anchor image for the Web page, identify the target image as the anchor image for the Web page.

16. The computer storage medium of claim 15, having further instructions that, when executed by the computer, cause the computer to apply an image dimension rule, whereby if the target image does not at least meet a minimum image dimension or if the target image exceeds a maximum image dimension, it is determined that the target image should not be selected as the anchor image for the Web page.

17. The computer storage medium of claim 15, wherein the instructions that, when executed by the computer, cause the computer to apply the one or more rules regarding anchor image selection further comprise instructions that, when executed by the computer, cause the computer to apply an image uniform resource locater ("URL") pattern rule, whereby if the target image is associated with a URL that conforms to a URL pattern that is included in a white list, it is determined that the target image should not be selected as the anchor image for the Web page.

18. The computer storage medium of claim 15, wherein the instructions that, when executed by the computer, cause the computer to apply the one or more rules regarding anchor image selection further comprise instructions that, when executed by the computer, cause the computer to apply a rule to determine whether the target image includes text that is the same as text included in a title of the Web page or a video contained therein, whereby if the target image includes text that is the same as text included in the title of the Web page or the video contained therein, it is determined that the target image should be selected as the anchor image for the Web page.

\* \* \* \* \*